(12) United States Patent
Carriere, IV et al.

(10) Patent No.: US 9,983,569 B2
(45) Date of Patent: May 29, 2018

(54) SYSTEM AND METHOD FOR REPRESENTING A FIELD OF CAPTURE AS PHYSICAL MEDIA

(71) Applicant: Scandy, LLC, Elmwood, LA (US)

(72) Inventors: Charles Pierre Carriere, IV, New Orleans, LA (US); Kaben Gabriel Nanlohy, New Orleans, LA (US); Harold Cole Wiley, New Orleans, LA (US)

(73) Assignee: Scandy, LLC, Elmwood, LA (US)

( * ) Notice: Subject to any disclaimer, the term of this patent is extended or adjusted under 35 U.S.C. 154(b) by 0 days. days.

(21) Appl. No.: 15/243,555

(22) Filed: Aug. 22, 2016

(65) Prior Publication Data

US 2018/0052446 A1 Feb. 22, 2018

(51) Int. Cl.
*G05B 19/4099* (2006.01)
*G06T 3/00* (2006.01)
*H04N 5/232* (2006.01)

(52) U.S. Cl.
CPC ........ *G05B 19/4099* (2013.01); *G06T 3/0062* (2013.01); *H04N 5/23238* (2013.01); *G05B 2219/49023* (2013.01); *G06T 2207/20221* (2013.01); *G06T 2210/22* (2013.01)

(58) Field of Classification Search
CPC ....... G06T 2207/20221; G06T 2210/22; G06T 3/0062; G05B 2219/49023; G05B 19/4099; H04N 5/23238
See application file for complete search history.

(56) References Cited

U.S. PATENT DOCUMENTS

| | | | |
|---|---|---|---|
| 7,778,485 B2 | 8/2010 | Zeineh et al. | |
| 2003/0128276 A1* | 7/2003 | Boyd | H04N 5/2628 348/208.6 |
| 2007/0081081 A1 | 4/2007 | Cheng | |
| 2007/0273767 A1 | 11/2007 | Kim | |
| 2009/0138233 A1* | 5/2009 | Kludas | G01C 15/00 702/158 |
| 2009/0263012 A1* | 10/2009 | Georgis | H04N 1/00167 382/163 |
| 2012/0188299 A1* | 7/2012 | Seki | B41J 3/4073 347/9 |
| 2013/0124471 A1* | 5/2013 | Chen | H04N 5/23238 707/624 |
| 2013/0293671 A1* | 11/2013 | Gorstan | H04N 5/23238 348/36 |
| 2014/0152806 A1* | 6/2014 | Hauk | H04N 5/222 348/121 |

(Continued)

*Primary Examiner* — Nathan L Laughlin
(74) *Attorney, Agent, or Firm* — AdamsIP, LLC; J. Hunter Adams; Gary Stewart

(57) ABSTRACT

The invention is directed to a system and method for representing how a photograph was captured in relation to the field capture, and mapping this onto a shape in a 3D dimensional print. More specifically, a group of images, or single image captured through a lens with field of view distortion, is captured and stored together as a group. The images may be stitched together to form a single image. Once stitched together, a three-dimensional file is created and stored to the system. A server then provides the three-dimensional file to a three-dimensional printer for printing. Once printed, the three-dimensional object is packaged and mailed to the sender.

13 Claims, 5 Drawing Sheets

(56) References Cited

U.S. PATENT DOCUMENTS

2016/0065842 A1\* 3/2016 McCloskey ........ H04N 1/00129
 348/36
2016/0078904 A1 3/2016 Yamaji et al.
2016/0203644 A1 7/2016 Kita et al.
2017/0054959 A1\* 2/2017 Kawakami ........... H04N 9/3185

\* cited by examiner

SYSTEM AND METHOD FOR REPRESENTING A FIELD OF CAPTURE AS PHYSICAL MEDIA

FIELD OF THE INVENTION

A preferred implementation of a version of the invention refers to a system and method for representing how a photograph was captured in relation to a field of capture, and mapping this onto the appropriate shape in a three-dimensional print.

BACKGROUND

A panorama is an unbroken view of the whole region surrounding an observer. This view is often considered the observer's field of view. Panoramic photography is a technique of photography that attempts to capture images without horizontally elongated fields of view.

There are many cameras and other devices capable of capturing panoramic images. However, there is no mechanism currently available to physically represent the field of view captured in a panoramic image. This is because panoramic photography is printed on flat media.

One problem with printing on flat media is that panoramic photographs cannot be printed with the same field of view in which they were shot. In other words, they are flat and not concave as when shot from a particular point. Moreover, if attempting to accurately print a user's field of view, there is an additional problem that multiple systems must be utilized since no individual system allows for printing of a panoramic photograph.

Accordingly, there is a need for a single system capable of representing how a photograph was captured in relation to the field of capture, and mapping this onto a three-dimensional print. Additionally, there is a need for a system capable of allowing individuals to take three-dimensional photographs and easily print representations of those photographs as taken.

SUMMARY

In accordance with one aspect of the principles of the invention, a system and method for representing how a photograph was captured in relation to the field of capture, and mapping this representation onto a three-dimensional shape in a three-dimensional print, is provided. The system may comprise multiple servers, databases, processors, and user interfaces.

According to another aspect, a system for capturing and analyzing image data is provided. As set forth herein, the system comprises a means for using the data from individual images to determine a field of capture. The field of capture is generated from a group of images being stitched together to form a panorama. One aspect of the invention is to create an integrated system allowing a user to upload images to a website and print those images as an accurate representation of a user's field of capture.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

The term "field of capture" is used herein to mean the area captured when taking a photograph or group of photographs. For example, a single photograph has a certain field of capture representing the area that was visible when taking the single photograph. Similarly, a group of individual photographs may collectively make up a field of capture, in which each photograph is a piece of the larger field of capture. In one embodiment, a field of capture may be a panorama picture or group of pictures making up a single panorama.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Systems and methods consistent with the principles of the invention may provide solutions for representing how a photograph was captured in relation to the field of capture, and mapping this onto the appropriate shape in a three-dimensional print. For example, the systems and methods may permit a user to capture images making up a user's field of view, upload said images to a website, have those images stitched together, and project the stitched-together image onto a three-dimensional object. Additionally, the system and method allows for printing the stitched-together image onto a three-dimensional object.

Figure 1:
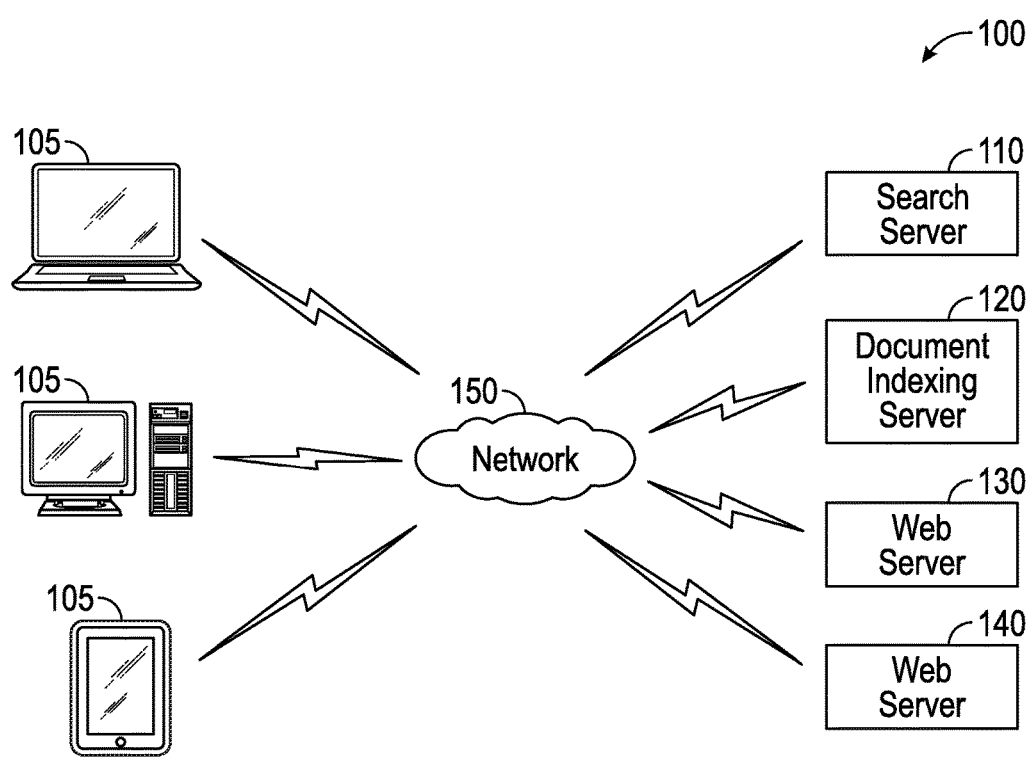
FIG. 1 is a diagram of an example environment in which techniques described herein may be implemented.

FIG. 1 is a diagram of an example environment 100 in which techniques described herein may be implemented. Environment 100 may include multiple clients 105 connected to one or more servers 110-140 via a network 150. In some implementations, and as illustrated, server 110 may be a search server, that may implement a search engine; and server 120 may be a document indexing server, e.g., a web crawler; and servers 130 and 140 may be general web servers, such as servers that provide content to clients 105. Clients 105 and servers 110-140 may be connected to network 150 via wired, wireless, or a combination of wired and wireless connections.

Three clients 105 and four servers 110-140 are illustrated as connected to network 150 for simplicity. In practice, there may be additional or fewer clients and servers. Also, in some instances, a client may perform the functions of a server and a server may perform the functions of a client.

Clients 105 may include devices of users that access servers 110-140. A client 105 may include, for instance, a personal computer, a wireless telephone, a personal digital assistant (PDA), a laptop, a smart phone, a tablet computer, a camera, or another type of computation or communication device. Servers 110-140 may include devices that access, fetch, aggregate, process, search, provide, and/or maintain documents, filed, and/or images. Although shown as single components 110, 120, 130, and 140 in FIG. 1, each server 110-140 may, in some implementations, be implemented as multiple computing devices, which potentially may be geographically distributed.

Search server 110 may include one or more computing devices designed to implement a search engine, such as a documents/records search engine, general webpage search engine, image search engines, etc. Search server 110 may, for example, include one or more web servers to receive search queries and/or inputs from clients 105, search one or more databases in response to the search queries and/or inputs, and provide documents, files, or images, relevant to the search queries and/or inputs, to clients 105. In some implementations, search server 110 may include a web search server that may provide webpages to clients 105, where a provided webpage may include a reference to a web server, such as one of web servers 130 or 140, at which the desired information and/or links is located. The references, to the web server at which the desired information is located, may be included in a frame and/or text box, or as a link to the desired information/document.

Document indexing server 120 may include one or more computing devices designed to index files and images available through network 150. Document indexing server 120 may access other servers, such as web servers that host content, to index the content. In some implementations, document indexing server 120 may index files/images stored by other servers, such as web servers 130 and 140 and, connected to network 150. Document indexing server 120 may, for example, store and index content, information, and documents relating to three-dimensional images and field of view images and prints.

Web servers 130 and 140 may each include web servers that provide webpages to clients. The webpages may be, for example, HTML-based webpages. A web server 130/140 may host one or more websites. A website, as the term is used herein, may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

While servers 110-140 are shown as separate entities, it may be possible for one or more servers 110-140 to perform one or more of the functions of another one or more of servers 110-140. For example, it may be possible that two or more of servers 110-140 are implemented as a single server. It may also be possible for one of servers 110-140 to be implemented as multiple, possibly distributed, computing devices.

Network 150 may include one or more networks of any kind, including, but not limited to, a local area network (LAN), a wide area network (WAN), a telephone network, such as the Public Switched Telephone Network (PTSN), an intranet, the Internet, a memory device, another type of network, or a combination of networks.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
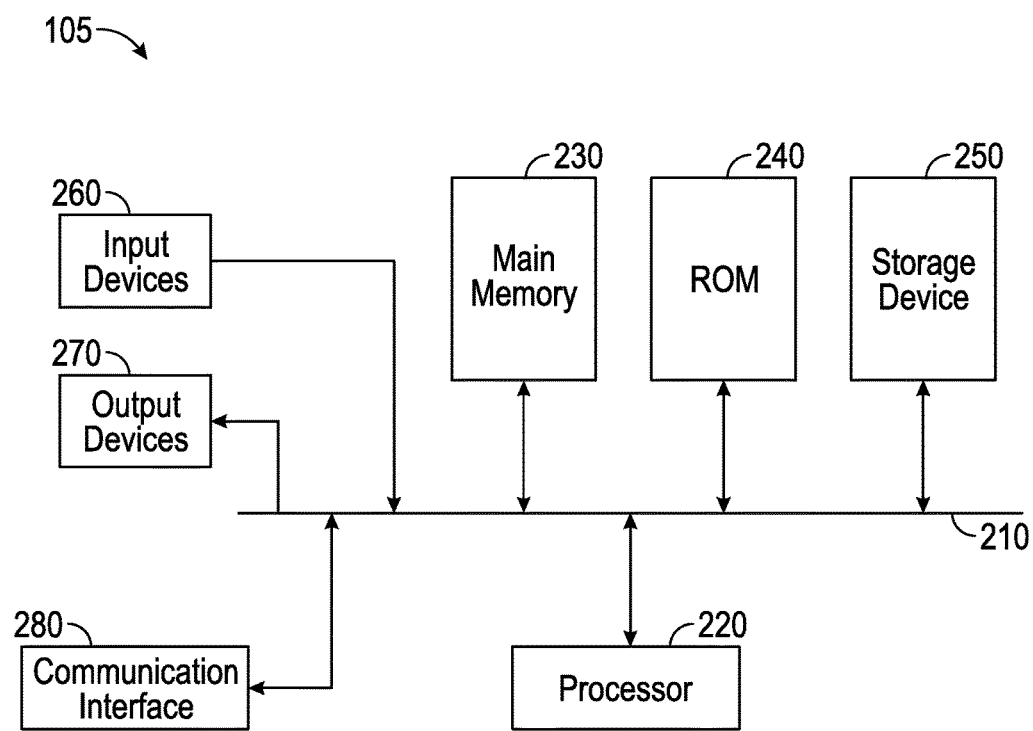
FIG. 2 is an exemplary diagram of a client of FIG. 1 according to an implementation consistent with the principles of the invention.

FIG. 2 is an exemplary diagram of a user/client 105 or server entity (hereinafter called "client/server entity"), which may correspond to one or more of the clients and servers, according to an implementation consistent with the principles of the invention. The client/server entity 105 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity 105.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive. Storage device 250 may also include flash storage and its corresponding hardware.

Input device(s) 260 may include one or more conventional mechanisms that permit an operator to input information to the client/server entity 105, such as a camera, keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity 105 to communicate with other devices 105 and/or systems. For example, communication interface 280 may include mechanisms for communicating with another device 105 or system via a network, such as network 150.

As will be described in detail below, the client/server entity 105, consistent with the principles of the invention, performs certain image recording and printing operations.

The client/server entity 105 may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 causes processor 220 to perform processes that will be described in greater detail below. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 3:
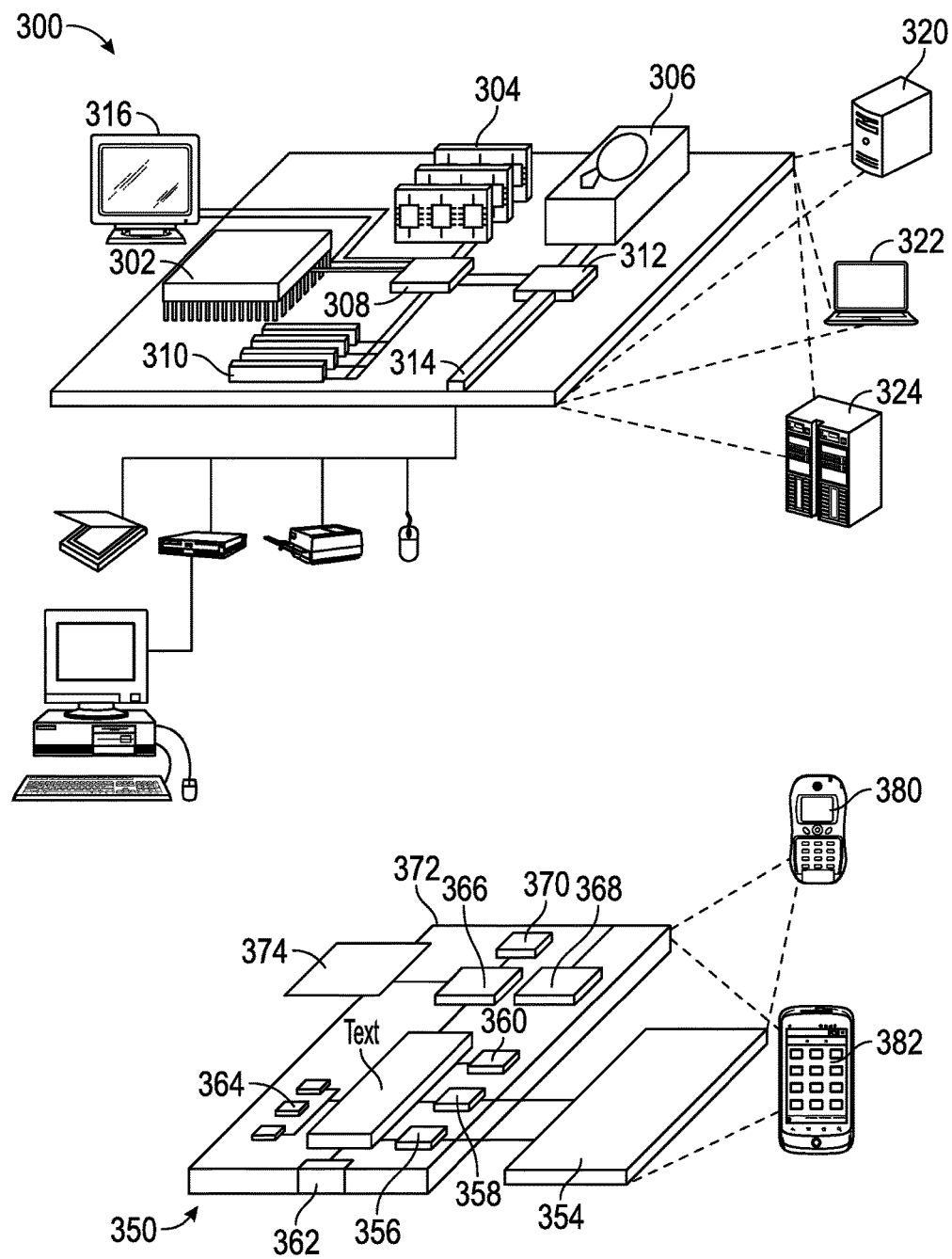
FIG. 3 is a diagram of an example of a computing device and a mobile computing device.

FIG. 3 is a diagram of an example of a computing device 300 and a mobile computing device 350, which may be used with the techniques described herein. Computing device 300 or mobile computing device 350 may correspond to, for example, a client 105 and/or a server 110-140. Computing device 300 is intended to represent various forms of digital computers, such as laptops, desktops, workstations, personal digital assistants, servers, mainframes, and other appropriate computers. Mobile computing device 350 is intended to represent various forms of mobile devices, such as personal digital assistants, cellular telephones, smart phones, tablet computers, and other similar computing devices. The components shown in FIG. 3, their connections and relationships, and their functions, are meant to be examples only, and are not meant to limit implementations described herein.

Computing device 300 may include a processor 302, a memory 304, a storage device 306, a high-speed interface 308 connecting to a memory 304 and high-speed expansion ports 310, and a low-speed interface 312 connecting to a low-speed expansion port 314 and a storage device 306. Each of components 302, 304, 306, 308, 310, 312, and 314 are interconnected using various buses, and may be mounted on a common motherboard or in other manners as appropriate. Processor 302 can process instructions for execution within computing device 300, including instructions stored in memory 304 or on storage device 306 to display graphical information for a graphical user interface (GUI) on an external input/output device, such as display 316 coupled to high-speed interface 308. In other implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within computing device 300. In some implementations, memory 304 includes a volatile memory unit or units. In another implementation, memory 304 may include a non-volatile memory unit or units. Memory 304 may also be another form of computer-readable medium, such as a magnetic or optical disk. A computer-readable medium may refer to a non-transitory memory device. A memory device may refer to storage space within a single storage device or spread across multiple storage devices.

Storage device 306 is capable of providing mass storage for computing device 300. In some implementations, storage device 306 may be or contain a computer-readable medium, such as a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or a memory on processor 302.

High-speed interface 308 manages bandwidth-intensive operations for computing device 300, while low-speed interface 312 manages lower bandwidth-intensive operations. Such allocation of functions is an example only. In some implementations, high-speed interface 308 is coupled to memory 304, display 316, such as through a graphics processor or accelerator, and to high-speed expansion ports 310, which may accept various expansion cards. In this implementation, low-speed interface 312 may be coupled to storage device 306 and low-speed expansion port 314. Low-speed expansion port 314, which may include various communication ports, such as USB, Bluetooth, Ethernet, wireless Ethernet, etc., may be coupled to one or more input/output devices, such as a keyboard, a pointing device, a scanner, or a networking device such as switch or router, e.g., through a network adapter.

Computing device 300 may be implemented in a number of different forms, as shown in the figures. For example, computing device 300 may be implemented as a standard server 320, or in a group of such servers. Computing device 300 may also be implemented as part of a rack server system 324. In addition, computing device 300 may be implemented in a personal computer, such as a laptop computer 322. Alternatively, components from computing device 300 may be combined with other components in a mobile device, such as mobile computing device 350. Each of such devices may contain one or more computing devices 300, 350, and an entire system may be made up of multiple computing devices 300, 350 communicating with each other.

Mobile computing device 350 may include a processor 352, a memory 364, an input/output ("I/O") device, such as a display 354, a communication interface 366, and a transceiver 368, among other components. Mobile computing device 350 may also be provided with a storage device, such as a micro-drive or other device, to provide additional storage. Each of the components 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display or other appropriate display technology. Display interface 356 may include appropriate circuitry for driving display 354 to present graphical and other information to a user. Control interface 358 may receive commands from a user and convert the commands for submission to processor 352. In addition, an external interface 362 may be provided in communication with processor 352, so as to enable near area communication of mobile computing device 350 with other devices. External interface 362 may provide, for example, for wired communications in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described herein, and may include secure information also. Thus, for example, expansion memory 374 may be provided as a security module for mobile computing device 350, and may be programmed with instructions that permit secure use of mobile computing device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described herein. The information carrier is a computer- or machine readable-medium, such as memory 364, expansion memory 374, or a memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS or MMS messaging, CDMA, TDMA, PDC, WCDMA, CDMA2000, or GPRS, among others. Such communication may occur, for example, through transceiver 368. In addition, short-range communication may occur, such as using a Bluetooth, WiFi, or other such transceiver. In addition, GPS (Global Positioning System) received module 370 may provide additional navigation-related and location-related wireless data to mobile computing device 350, which may be used as appropriate by applications running on mobile computing device 350.

Mobile computing device 350 may be implemented in a number of different forms, as shown in the figures. For example, mobile computing device 350 may be implemented as a cellular telephone 380. Mobile computing device 350 may also be implemented as part of a smart phone 382, personal digital assistant, or other similar mobile device.

Various implementations described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, such as magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

The contents of computer-readable medium may physically reside in one or more memory devices accessible by a server. Computer-readable medium may include a database of entries corresponding to field of view photographs and files. Each of the entries may include, but are not limited to, a plurality of images collectively making up a user's field of capture when taking the plurality of images, metadata relating to those images, GPS information and other like data.

To provide for interaction with a user, the techniques described herein can be implemented on a computer having a display device, such as a CRT (cathode ray tube), LCD (liquid crystal display), or LED (Light Emitting Diode) monitor, for displaying information to the user and a keyboard and a pointing device by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The techniques described herein can be implemented in a computing system that includes a back end component, such as a data server, or that includes a middleware component, such as an application server, or that includes a front end component, such as a client computer having a graphical user interface or Web browser through which a user can interact with an implementation of the techniques described herein, or any combination of such back end, middleware, or front end components. The components of the system can be interconnected by any form of medium of digital communication.

A preferred implementation of the invention discloses a system and method for representing how a photograph was captured in relation to the field of capture and mapping this field of capture onto an appropriate three-dimensional shape. As such, a preferred embodiment of the invention provides for a three-dimensional print having the same field of capture as when originally taken. The invention discloses a complete system for capturing, uploading, and printing three-dimensional photographs.

The system comprises a user management system allowing a user to upload images to a system website. The system further comprises a comprehensive file creation system that compiles a plurality of images collectively making up a field of capture into a single stitched image. The system further comprises altering the stitched image based on metadata or the images' specific parameters to form a three-dimensional printed object. The system further comprises a secure database for storing the files for later use. The system further comprises print management allowing a user to print various fields of capture in a tangible medium.

It is understood that embodiments of the invention disclosed herein may be created from any language using any framework. In one implementation the system comprises a suite of web services that power all of the applications and tools that comprise the system. This suite of servers allows a user to capture images, upload those images to a website, preview a stitched-together panorama photo, and send the approved panorama to a printer.

Figure 4:
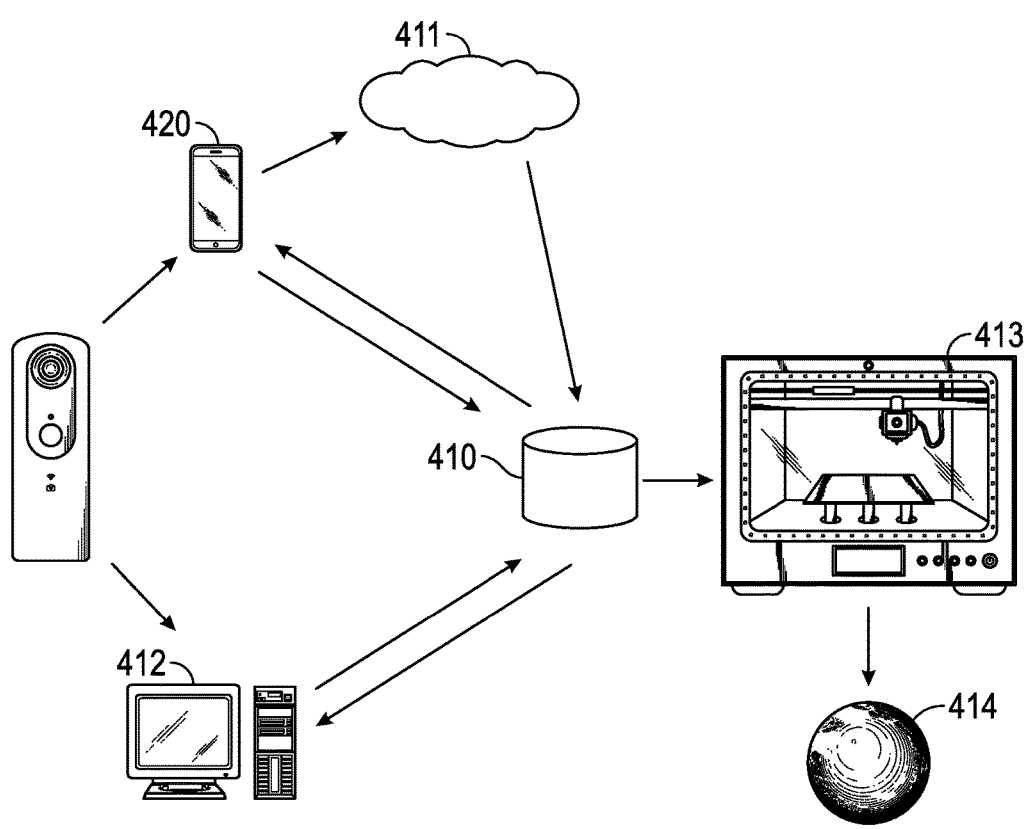
FIG. 4 is a diagram illustrating an example system configuration according to an implementation consistent with the principles of the invention.

As illustrated in FIG. 4, in a preferred embodiment, the system comprises at least one database 410 where all user photos, data, and files are stored. It is understood that the system may comprise more than one database for storing information. It is additionally understood that the database may be cloud storage. In a preferred embodiment, each user 420 is unique and must have a unique identification number when each user 420 is added to the system. In one embodiment, each user 420 uses a unique ten-digit phone number when each customer account is created. Alternatively, each user 420 uses a unique email address or alternative unique identifier. Additionally, the system may provide a unique identifier. Additional customer information, such as physical address, may also be stored at the time said customer account is created.

FIG. 4 shows a simple representation of an exemplar architecture of a version of the current invention. In one embodiment the system utilizes a database management system 410 such as Microsoft SQL, PostgreSQL, or similar. It is understood that various servers may be used to access stored data. Users 420 must connect through a service or server before accessing stored data. This ensures all access to the database 410 has been authenticated.

Figure 5:
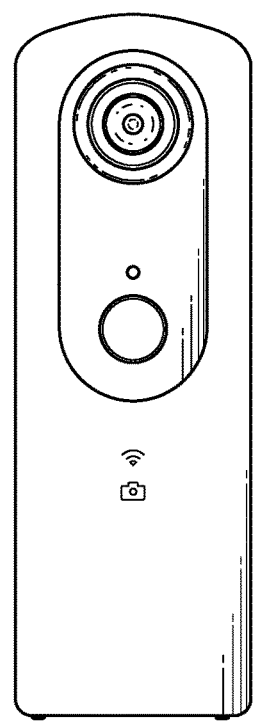
FIG. 5 illustrates an example of an off the shelf camera that may be used according to an implementation consistent with the principles of the invention.
Figure 6:
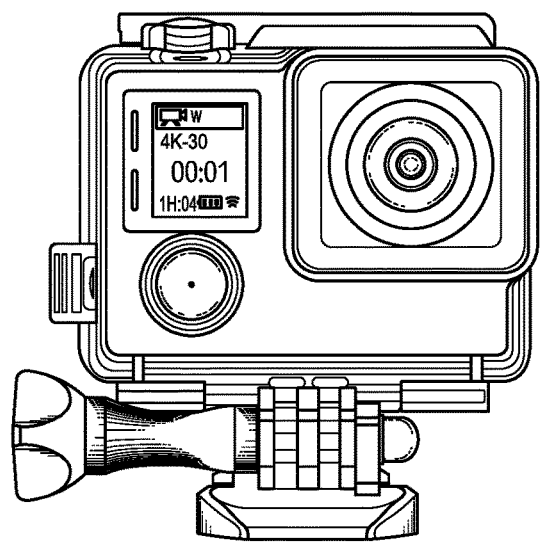
FIG. 6 illustrates an example of an off the shelf camera that may be used according to an implementation consistent with the principles of the invention.

As illustrated in FIG. 4, a user 420 captures a plurality of photographs before uploading the photographs into the system. The user 420 may use a mobile phone to take the photographs. Alternatively, the user 420 may use a camera to take the photographs. The user may use a three hundred and sixty degree camera such as the Ricoh Theta or Samsung Gear 360. In yet another embodiment, a user may utilize a camera having a "fish-eye" lens, such as a GoPro. In yet another embodiment a user may utilize the "panorama" mode of a phone or camera that stitches the panorama on the device and stores appropriate metadata information in the image. Preferably, these cameras will store the appropriate information in the metadata of the captured image. These cameras are provided only as examples and it is understood that any camera, both currently available and available in the future, capable of taking panoramic or three hundred and sixty degree photos may be utilized with the method and system disclosed herein. If using a camera, it is preferred that a fish-eye lens is used. Examples of currently available cameras are shown in FIG. 5 and FIG. 6.

In a preferred embodiment, a user 420 will open a system webpage or mobile application in order to receive prompts on taking individual pictures. Generally, the system application will present the user with pre-set areas in a field of view for aligning the phone's camera. These pre-set areas may be represented by dots on a smart-phone screen. Once aligned, a user will capture a photograph. In a preferred embodiment a user will rotate the phone about the user's body while capturing photos corresponding to each pre-set area in the system application's user interface.

As illustrated in FIG. 4, once all the photos are captured, a user 410 communicates with a web server 411 and gives the group of photos a name. This action causes the group of images to be associated to a single project. This may be done over an HTTP application program interface (API). Preferably, a user will give a name to the collective group of images for identification. The individual images are loaded to a database 410. In a preferred embodiment, the images are uploaded to the database as a zipped file. A web server associates the user with the new named images and generates a new asset path for the images.

As set forth herein, a system and method detects the field of capture of the images and projects the images to be printed as originally taken. To create a file for printing, the files from storage 410 are downloaded to a local server 412. In a preferred embodiment, the files are downloaded from cloud storage. The local server 412 unzips the images onto a local hard drive and feeds the unzipped images into stitching software. The images are stitched together and the field of view is calculated based on analyzing specific metadata of the various images. Alternatively, if metadata is not available, the system calculates the most likely field of capture based on the image dimensions.

In some situations, the only metadata available relates to the focal length of the lens and the width and height of the image. The focal length of a lens is an inherent property of the lens and is the distance from the center of the lens to the point at which objects at infinity focus. As such, the system may utilize the focal length and height of the image to calculate a field of view for projecting an image or images onto a sphere or other object. In a preferred embodiment, using this information, the horizontal field may equal [2 a tan(0.5 width/focallength)]. Furthermore, using this information, the vertical field of view may be equal to [vertical field of view=2 a tan(0.5 height/focallength)].

In a preferred embodiment, the images are stitched together and any lens distortion is corrected. Images may be stitched together using any means known in the art. For example, AUTOPANOSERVER or PHOTOSHOP may be utilized to stitch together the various photos. Once stitched together, the images are manipulated for creating the three-dimensional printable object. Preferably, the system parses image metadata to determine what information is available about the panoramic image. If metadata is available, that information is used to calculate the projection onto either a sphere or cylinder.

As further illustrated in FIG. 4, once the stitched image has been successfully analyzed for metadata, the image is cropped and scaled to map onto a physical object. In a preferred embodiment, the physical object is a sphere or cylinder 414. However, it is understood that other objects may be utilized and still fall within the scope of this disclosure. A three-dimensional print ready file is created based on the cropped image data. Additional data may include the diameter, wall thickness, and hole size. The three-dimensional print ready file is exported to the database 410. A user 420, may preview an image or video of the three-dimensional file. Once approved, the three-dimensional files are sent to a three-dimensional printer 413. The resulting product 414 is a an accurate representation of a field of capture.

In a preferred implementation, the system utilizes an equirectangular projection represented by three hundred sixty degrees of latitude by one hundred eighty degrees of longitude. As such, the system utilizes an aspect ratio of 2.0 (360°/180°). Because spherical panoramas are often large and/or incomplete, it is preferable that they be cropped to exclude data that was not captured. In order to correctly display a cropped spherical panorama it is preferable that the images be uncropped. The system generally requires the following to uncrop an image: (a) the width and height of the cropped image; (b) the width and height of the uncropped image; and (c) the horizontal and vertical offset of the cropped image within the uncropped image. This information may come in various forms of metadata and it is understood that said forms of metadata fall within the scope of this disclosure. One form of metadata used is GPano metadata, otherwise known as Photo Sphere XMP Metadata. In a preferred embodiment, the system computes GPano metadata as follows: (a) GPano:CroppedAreaImageWidthPixels=finalRender.nCols; (b) GPano:CroppedAreaImageHeightPixels=finalRender.nRows; (c) GPano:FullPanoWidthPixels=GPano:CroppedAreaImageWidthPixels/(projection.xnMax−projection.xnMin); (d) GPano:FullPanoHeightPixels=GPano:CroppedAreaImageHeightPixels/(projection.ynMax−projection.ynMin); (e) GPano:CroppedAreaLeftPixels=GPano:FullPanoWidthPixels*projection.xnMin; (f) GPano:CroppedAreaTopPixels=GPano:FullPanoHeightPixels*projection.ynMin. Noting that, xnMin, xnMax, ynMin, and ynMax are normalized to the interval [0,1]. Also noting that, xnMin<xnMax and ynMin<inmate. Also noting that, for an uncropped panorama, xnMin=0, xnMax=1, ynMin=0, ynMax=1.

Generally, this metadata is embedded in each image's files. The GPano metadata is embedded in image files using Adobe's Extensible Metadata Platform format.

The system may utilize photo sphere properties to create the media to be printed. The specific photo sphere meta data properties are dependent on the images taken and it is understood that the system may utilize different photo sphere metadata parameters. In one embodiment, the system may utilize Euler angles to provide a mapping from the points in the various photos that are stitched together. Further, artificial intelligence may also be utilized to learn from the user input on whether mapping is accurate.

The correctness of the image metadata is not guaranteed. For example, the panorama may be scaled to dimensions that disagree with the embedded dimensions. A spherical panorama can be produced by many different camera systems, some of which may embed incorrect metadata in the image. If originally correct, when a panorama is edited, the editor can corrupt or fail to update GPano metadata. As such, it is preferable for the system to validate the metadata.

In a preferred embodiment, panoramas created using the system will include proper metadata. For panoramas created outside the system, the system preferably uses two tactics to validate and correct bad or missing GPano metadata for a equirectangular projection. If GPano metadata is present, but the actual dimensions disagree with the embedded dimensions, the system checks whether the original and actual aspect ratios agree to within around 1%. If so, the system scales the GPano data to match the actual image dimensions. If no GPano metadata is present, but the panorama has aspect ratio within 1% of 2.0, then the system assumes the panorama is an uncropped equirectangular projection and adds GPano metadata describing this assumption.

When stitching images into a panorama, the system may decide it has too little data to reliably place the panorama onto a sphere, in which case it may create a cylindrical projection. If the system decides it cannot reliably place the panorama onto a cylinder, it may create a simple planar projection. Additionally, the system may receive a preassembled panorama that it does not believe to be spherical. In this case, the system may make the assumption that the panorama may be handled as a cylinder and the measurements will be approximated for printing.

The process of mapping the image onto a sphere takes into account the ideal image to wrap onto the object and then modifies the image by scaling and cropping to fit in onto a shape without distorting the image.

The system generates a three-dimensional file that may be loaded into three-dimensional printing software with no modifications and be printed in full color. In a preferred embodiment the file includes diameter, wall thickness, and hole sizes specified by for the object to be printed. The object is cropped so that the image projected onto it is the only part of the sphere remaining.

Preferably, the file to be printed is exported as a Virtual Reality Modeling Language (VRML) file. However, it is understood that any file formats may be used and still fall within the scope of the method and system. The files are then uploaded directly to be printed. For example, the system may utilize three-dimensional print software by 3D Systems. In a preferred embodiment, the user can print the file without further manipulation. The system may then use any computer graphics software to create this file. For example, BLENDER may be utilized. The three-dimensional file is then synced to the cloud storage in a location specified by the web server. This three-dimensional file is then ready to be downloaded by the three-dimensional printer operator and loaded directly into the three-dimensional printing software.

If the image is not a full three hundred sixty degree by one hundred eighty degree panorama (true spherical) a scaling and cropping code applies to the sphere itself so that the system provides partial spheres that represent the area that has been captured by the photographs. As such, the system selectively cuts out the region of the sphere that physically represents the shape of the panoramic photograph that was actually captured in the field of capture. For example, if the stitched image is not a full three hundred sixty degree by one hundred eighty degree (true spherical), only that portion of the field of capture which was originally represented will be projected onto the sphere. In a preferred embodiment, the system projects a whole three hundred sixty degree by one hundred eighty degree panorama onto a sphere and then crops the sphere such that the only remaining portions of the sphere are the areas that were captured in the original Field of View.

The server then exports the three-dimensional file such that a preview image or video of the three-dimensional file is generated and presented to a user via a user interface. Additionally, the uploaded three-dimensional files and stitched panorama may be uploaded and stored to the cloud storage.

In a preferred embodiment, a user uses a smart phone to open the system's mobile application. The user is presented with a user interface displaying a plurality of dots. The user moves the phone until the field of capture is aligned with one of the plurality of dots. In a preferred embodiment, the dots will emphasize or change colors when the field of capture is properly aligned. Once aligned, the user captures the image. The user moves the smart phone about her body in order to capture each field of capture corresponding to each one of the plurality of dots on the user interface. Once all of the images are captured, a user uploads the images to the system website. The user's images may be automatically loaded to the system website from the mobile application. Alternatively, a user may use a web browser to navigate to the system website. In one embodiment, the system website comprises a plurality of web pages. In a preferred embodiment, each webpage is accessed via tabs on the system website homepage or other system webpage. Links or tabs allow a user to navigate from one page to another. Some implementations of the invention further comprise web-based forms with text fields therein. In a preferred embodiment, said text fields auto populate predetermined forms, webpages, databases, servers, or other targeted destinations. In one embodiment, a user accesses a webpage that accesses a database via a server.

In a preferred embodiment, user images and data are tied to a specific user such that the actions and data relating to the user are grouped with that user, separately from other users on the system. Generally, a user requests a server via a user interface to access customer images, files, and data. The server verifies the user's permission level to access said user images, files, and data. It is understood that various forms of verification may be used, including login names and passwords, device recognition, or other known authentication means.

The server accesses user images, files, and data based on the requesting user's permission level. The server then communicates, based on the received user request, the requested user images, files, and data. The server then generates output information that includes the requested user images, files, and data. The server then provides the output information to a user interface relating to the user's request and permission levels.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without references to the specific software code— it being understood that one of ordinary skill in the art would be able to design software and control hardware to implement the aspects based on the description herein.

The invention claimed is:

1. A method of representing a field of capture in the form of a physical media, said method comprising:
   capturing, by a user, a plurality of images, wherein the plurality of images forms the field of capture;
   storing the plurality of images in a database;
   requesting, by a user via a user interface, a server to access the images from the database;
   communicating, by the server, based on the received user request, the requested images;
   receiving, by the server, requested images from the database based on the user's request;
   generating, by the server, output information that includes the requested images being stitched together as a stitched image in a file;
   storing the stitched image in the database;
   determining, by the server, the orientation of the stitched image on a sphere or cylinder utilizing metadata, the metadata comprising:
      the width and height of a cropped image within an uncropped image;
      the width and height of the uncropped image; and the horizontal and vertical offset of the cropped image within the uncropped image, and
   wherein the orientation of the image is based on a user's field of capture when capturing each of the plurality of images;
   generating, by the server, a file relating to a three-dimensional print, wherein the file represents the stitched image as the field of capture;
   storing the file in the database;
   providing, by the server to a printer, said file relating to the user's request; and
   printing, by the printer, said file, received from the server.

2. The method of claim 1, wherein the server abstracts metadata from each of the plurality of images making up the stitched image to be projected onto the sphere or cylinder.

3. The method of claim 1, wherein the metadata is GPano metadata.

4. The method of claim 1, further comprising utilizing a focal length of a lens that captured the image and a height of the image to determine a field of view for projecting an image or images onto the sphere or cylinder.

5. A method for representing a field of capture in the form of a physical media, said method comprising:
   receiving, by a processing device, user images, wherein a plurality of said user images comprise the field of capture;
   receiving, by the processing device, the user images relating to the field of capture;
   receiving, by the processing device, metadata information relating to each of the plurality of images;
   generating, by the processing device, printing file-type information including a stitched image representing the field of capture;
   receiving, by the processing device and from a user, a user request to print the field of capture, said field of capture being accessible based on the images collectively making up the field of capture, and stitched image, being accessible via a database;
   receiving, by the processing device and from the database, information relating to the user request based on the field of capture;
   communicating, by the processing device from the database, said user information to a user interface;
   providing, by the processing device and for presentation to the user interface, the requested user information;
   determining, by the processing device and based on the user request, at least one supporting application to use for processing the user request;
   communicating, by the processing device, with the at least one supporting application;
   updating, by the processing device and based on communicating with at least one supporting application, output information for the user interface;
   providing, by the processing device and for presentation in the user interface, the updated output information, the updated output information being recorded and stored in the database;
   providing, by the processing device to a three-dimensional printer, said output information relating to the user request as a file relating to a three-dimensional print; and
   printing, by the three-dimensional printer, a three-dimensional object making up a visual representation of a user's field of view,
      wherein the processing device utilizes metadata to determine the orientation of the stitched image on a sphere or cylinder, wherein the metadata utilized to determine the orientation of the stitched image on the sphere or cylinder comprises:
the width and height of a cropped image within an uncropped image;
the width and height of the uncropped image; and
the horizontal and vertical offset of the cropped image within the uncropped image.

6. The method of claim 5, wherein the processing device abstracts metadata from each individual image making up the stitched image to be projected onto the sphere or cylinder.

7. The method of claim 5, further comprising utilizing a focal length of a lens that captured the image and a height of the image to determine a field of view for projecting an image or images onto the sphere or cylinder.

8. The method of claim 5, wherein the metadata is GPano metadata.

9. A method for representing a field of capture in the form of a physical media, said method comprising:
receiving, from an image capturing device, a panorama image, said panorama image having metadata relating to the field of capture;
storing the panorama image and metadata in a database;
providing, by a first server, the panorama image and metadata to a second server, wherein the second server is a local server;
analyzing, by the second server, the metadata of the panorama image and cropping and scaling said panorama image to portray the field of capture;
storing the cropped and scaled panorama image and metadata as a three-dimensional file;
exporting, by the first server, the three-dimensional file to a printer; and
printing the three-dimensional file onto physical media, wherein the physical media has a curved surface, and wherein the printed media comprises the field of capture,
wherein the second server utilizes metadata to determine the orientation of the panorama image on the physical media, the metadata utilized to determine the orientation of the panorama image on the physical media comprising:
the width and height of each of the plurality of images collectively making up the panorama image within an uncropped image;
the width and height of the uncropped image; and
the horizontal and vertical offset of a cropped image within the uncropped image.

10. The method of claim 9, wherein the physical media is a sphere or cylinder.

11. The method of claim 10, wherein the second server abstracts metadata from the plurality of images collectively making up the panorama image to be projected onto the sphere or cylinder.

12. The method of claim 10, wherein the metadata is GPano metadata.

13. The method of claim 9, further comprising utilizing a focal length of a lens that captured the image and a height of the image to determine a field of view for projecting an image or images onto the physical media.

* * * * *